June 6, 1933.  C. H. KUGLER  1,912,583

CUTTING MEANS FOR GRADERS OR LIKE IMPLEMENTS

Filed Jan. 31, 1933

Inventor,
Charles H. Kugler,

By Baldwin & Wight

Attorneys.

Patented June 6, 1933

1,912,583

UNITED STATES PATENT OFFICE

CHARLES H. KUGLER, OF LEXINGTON, NEBRASKA

CUTTING MEANS FOR GRADERS OR LIKE IMPLEMENTS

Application filed January 31, 1933. Serial No. 654,497.

This invention relates to cutting means for graders or like implements and more particularly to cutting means for road graders adapted to cut or trim a bank along the side of a road whose surface is being graded.

One very prevalent form of road grader is that which includes a wheeled frame structure mounting an elevating conveyor transversely of the line of movement of the implement and a disc plow adjacent the mouth of the conveyor and at an angle thereto whereby earth cut by the plow is deflected on to the conveyor. Machines of this type heretofore known are useful for rapid "roughing off" of the top surface of a road but are subject to the disadvantage of not being capable of trimming the bank along the side of the road.

An object of the present invention is to provide, in an implement of the general nature referred to, a cutter so positioned and of such shape as efficiently to cut away and trim a bank extending along the edge of a surface being worked, and, when used in connection with elevating graders, to direct the earth cut from the bank in front of the ground cutting plow in such a way that the latter in turn will deflect the earth onto the conveyor. Other objects will become apparent from the following description, the appended claims, and the accompanying drawing, in which:

Figure 1:
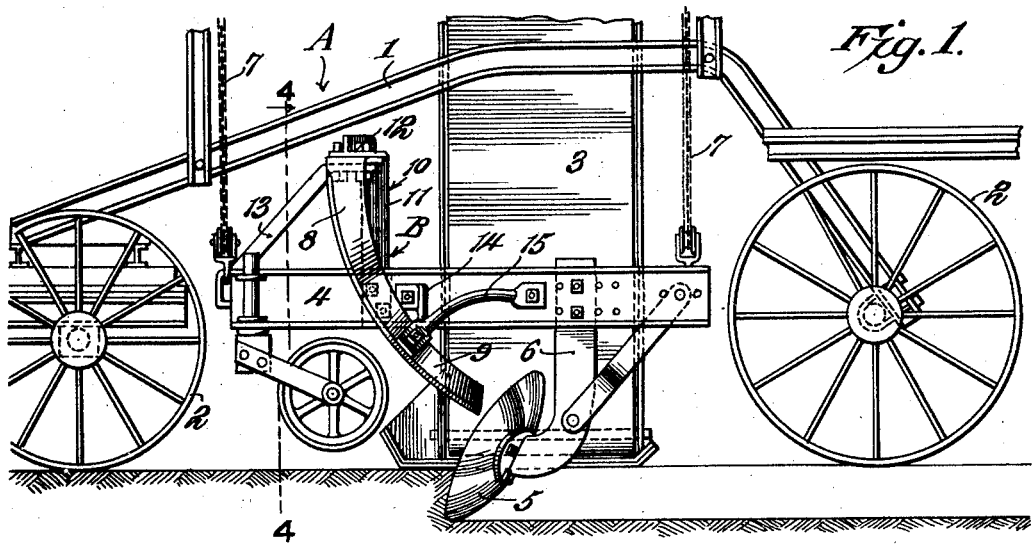
Figure 1 is a fragmentary side elevation of a road grader embodying the invention.
Figure 2:
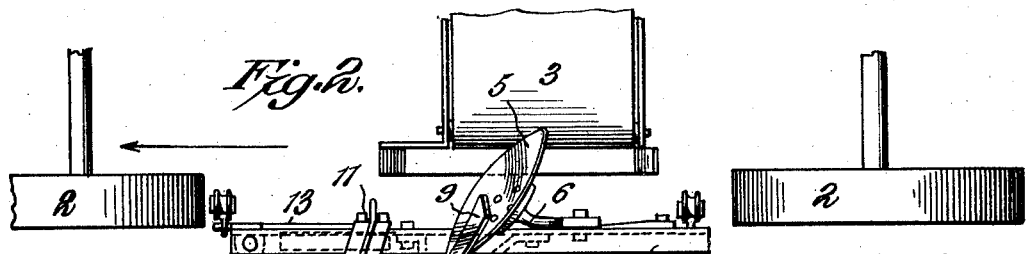
Figure 2 is a fragmentary top plan view thereof.
Figure 3:
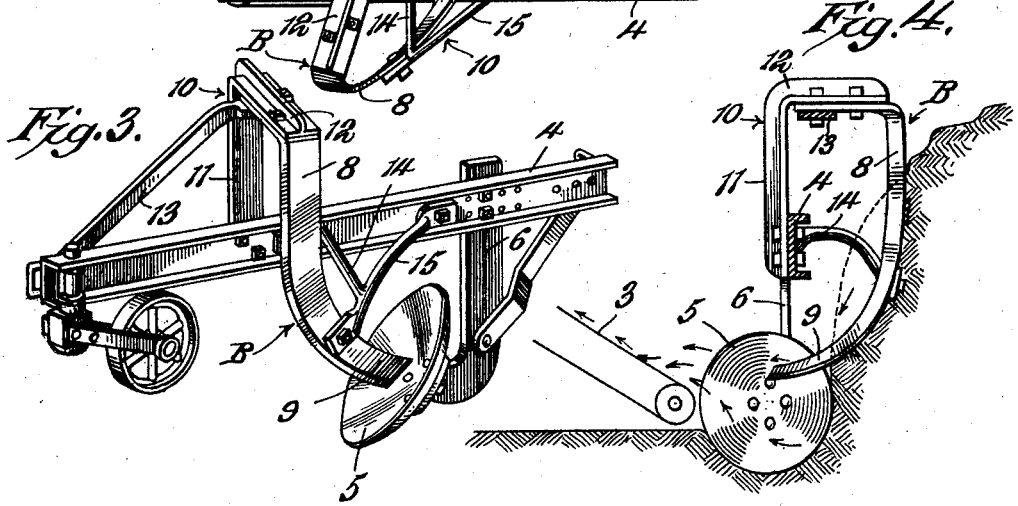
Figure 3 is a perspective view of a beam member and cutting means mounted thereon in accordance with the invention.
Figure 4:
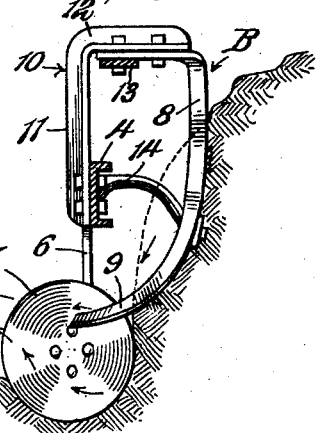
Figure 4 is a transverse vertical sectional view taken on the line 4—4 of Figure 1.

In the drawing, a practical embodiment of the invention is illustrated in connection with an elevating grader A including a frame generally designated 1 supported on wheels 2, an elevating conveyor generally designated 3 supported by the frame and extending transversely thereof, and a beam 4 upon which are mounted cutting means in accordance with the invention. A disc plow element 5 is connected to the beam 4 by means of a bracket 6 and is disposed adjacent and at an angle to the mouth or lower end of the conveyor 3 so as to deflect earth onto the conveyor. Chains 7—7 serve to support the beam 4 in adjusted position relative to the frame 1 in a well known manner.

In accordance with my invention, I provide a bank cutter generally designated B mounted on the beam 4 and extending beyond the plow 5 on the side thereof opposite the conveyor 3, the lower end of the bank cutter extending in front of and terminating in spaced relation to the plow 5. In the form shown, the bank cutter B includes a substantially vertically extending upper part 8 which is positioned laterally beyond the plow 5 and a lower curved part 9 which extends in front of the plow. The bank cutter B may conveniently be connected to the beam 4 by means of a bracket generally designated 10 and including a vertically extending leg 11 secured to the beam and a horizontally extending leg 12 to which the upper end of the bank cutter B is attached. In order to provide a rigid structure and to prevent chattering of the cutter, I prefer to employ stiffening braces 13, 14, and 15 as shown.

It is important that the cutter B be of such shape and be so positioned as to guide the earth cut from the bank directly in front of and well above the bottom of the plow 5, so that the latter in turn will deflect the earth onto the conveyor 3. The importance of this arrangement will be apparent when it is considered that if the earth cut from the bank were not discharged in front of the plow 5 there would be formed a continuous ridge of loose earth trailing behind the implement. The shaping of the bank cutter so as to deliver cut earth in front of the plow also serves to prevent clogging of the latter, since the earth is fed continuously from the cutter to the plow and thence to the elevator.

Since most disc plows used in elevating graders of the type shown herein are curved in cross section, I prefer to form the lower end 9 of my bank cutter so as to have a curvature substantially the same as that of the plow in a horizontal plane, this arrangement serving to enhance the smooth continuous flow of cut earth from the bank cutter past the plow and onto the conveyor. Further to assure the feeding of cut earth into the path of the plow 5, the upper portion 8 of the cutter B preferably is inclined from front to rear inwardly toward the beam 4, this arrangement preventing cut earth from slipping past the rear edge of the cutter.

A bank cutter constructed and arranged in accordance with my invention is useful for trimming brush and vines from the bank as well as for actually cutting dirt from the bank. Although the construction disclosed herein embodies the invention in a preferred practical form, it will be understood that various modifications in the specific formation and arrangement of elements may be made without departing from the invention as defined in the claims.

I claim:

1. In a grader or like implement, the combination of a conveyor; a ground cutting element located adjacent the mouth of the conveyor and being adapted to deflect dirt onto the conveyor; and a supplemental cutting element extending above said ground cutting element on the side thereof opposite said conveyor and the lower part of said supplemental cutting element being directed inwardly and terminating in front of and in spaced relation to said ground cutting element.

2. In a grader or like implement, the combination of a conveyor; a plow element located adjacent the mouth of the conveyor and being set at an angle to deflect dirt onto the conveyor; and a bank cutter extending above said plow element on the side thereof opposite said conveyor, the lower part of said bank cutter being curved inwardly in front of said plow element and terminating with its extreme lower end spaced forwardly of said plow element and disposed well above the bottom thereof.

3. In a grader or like implement, the combination of a conveyor; a disc plow element of curved cross section located adjacent the mouth of the conveyor and set at an angle to deflect dirt onto the conveyor; and a bank cutter extending above said plow element on the side thereof opposite said conveyor, the lower part of said bank cutter being curved inwardly in front of said plow element with its extreme lower end spaced forwardly of said plow element and the portion of said bank cutter which is disposed in front of said plow element being of substantially the same curvature in a substantially horizontal plane as said plow element.

4. Cutting means for a grader or like implement including a frame, said means comprising a ground plow element mounted on said frame at an angle to the line of movement of the machine; and a bank cutter mounted on said frame and extending above and laterally beyond the leading edge of said plow element, the lower part of said bank cutter being directed inwardly and terminating in spaced relation to said plow element above the bottom thereof.

5. Cutting means for a grader or like implement including a frame, said means comprising a ground plow element mounted on said frame at an angle to the line of movement of the machine, and a bank cutter mounted on said frame and extending in front of, above, and laterally beyond the leading edge of said plow element, said bank cutter being curved rearwardly and inwardly and the extreme lower end thereof terminating in front of and in spaced relation to said plow element.

In testimony whereof, I have hereunto subscribed my name.

CHARLES H. KUGLER.